United States Patent [19]

Comerford et al.

[11] Patent Number: 4,776,006
[45] Date of Patent: Oct. 4, 1988

[54] MULTIPLEXED DATA CHANNEL CONTROLLED TELEPHONE SYSTEM

[75] Inventors: Timothy N. Comerford, Indianapolis, Ind.; Jan R. Holliday, Belleville, Ill.; Michael J. McLane, Indianapolis, Ind.

[73] Assignee: AT&T Bell Laboratories, Murray Hill, N.J.

[21] Appl. No.: 41,567

[22] Filed: Apr. 23, 1987

[51] Int. Cl.$^4$ ............. H04M 1/72; H04M 9/100
[52] U.S. Cl. ................... 379/159; 370/76; 379/164; 379/387; 379/396
[58] Field of Search ........... 379/156, 157, 158, 159, 379/160, 165, 177, 182, 396, 387, 164; 370/69.1, 76

[56] References Cited

U.S. PATENT DOCUMENTS

| | | | |
|---|---|---|---|
| 2,535,446 | 6/1942 | Mitchell | 175/2.5 |
| 3,573,379 | 4/1971 | Schmitz et al. | 179/15 |
| 3,937,889 | 2/1976 | Bell, III | 379/94 |
| 3,949,172 | 4/1976 | Brown et al. | 179/2.5 |
| 4,049,914 | 9/1977 | Anderson et al. | 179/2.5 |
| 4,058,678 | 11/1977 | Dunn | 379/66 |
| 4,196,317 | 4/1980 | Bartelink | 179/37 |
| 4,382,163 | 5/1983 | White | 379/164 |
| 4,442,320 | 4/1984 | James | 379/50 |
| 4,578,540 | 3/1986 | Borg et al. | 179/2 A |
| 4,604,741 | 8/1986 | Barsellotti | 379/165 |

OTHER PUBLICATIONS (Publication) ITT, "EKS-701 Electronic Key Telephone System", Feb. '83, Front Page.
"MCD Aids Small Phone Systems", *Electronic Engineering Times*, Warren Andrews, 3/10/86, page 44.

*Primary Examiner*—Jin F. Ng
*Assistant Examiner*—Wing Fu Chan
*Attorney, Agent, or Firm*—Michael A. Morra

[57] ABSTRACT

A multiplexed data channel telephone system comprising a master station (221) and one or more remote stations (222) is disclosed. Each station (221, 222) is bridged, in a parallel electrical connection, onto a wire-pair (201) that extends from the stations to a telephone switching system. Each station (221, 222) includes a voiceband line interface (110, 310) for connecting to the wire-pair (201) at voiceband frequencies, and a radio frequency line interface (700, 800) for connecting to the wire-pair (201) at radio frequencies. Each station further includes multiplexer and demultiplexer equipment (500, 600) for frequency shifting a data channel between baseband and rf. Amplitude modulation and half-duplex transmission are used in the data channel. Telephone status and control information, including ringing and answer control, are exchanged between controllers (160, 360) via the data channel. Remote stations (222) minimize the amount of equipment required by using the data channel to control common equipment at the master station (221) that interacts with incoming telephone lines (201, 202).

9 Claims, 9 Drawing Sheets

MULTIPLEXED DATA CHANNEL CONTROLLED TELEPHONE SYSTEM

FIELD OF THE INVENTION

The present invention relates to telephone systems having a master and one or more remote stations and more particularly to a system in which the master station performs telephone control functions under the control of a remote station.

BACKGROUND OF THE INVENTION

It has become increasingly desirable in our communications-oriented society to upgrade and improve business and residential telephone equipment by adding telephones having improved functionality and increasing the number of incoming telephone lines at minimal cost. However, since one cannot expect to find more than a single wire-pair at any given location, it is frequently necessary to supply additional wiring beyond the single wire-pair used for basic telephone service in order to increase the number of communication channels. Costs associated with adding or relocating wires can be significant. Furthermore, many commercially available systems that are used to increase information distribution capacity are incompatible with existing telephone equipment, so a user's investment is immediately eroded.

From a convenience standpoint, it is desirable for a customer to merely purchase a telephone product, take it home, and plug it into an existing telephone jack. Many systems that utilize the local telephone wire-pair at a user's premises require that a master station be placed in a series connection with the incoming wire-pair from the telephone central office. Series connections require that internal wiring be modified which usually means that a telephone installer or an electrician needs to be hired.

A problem, however, with having multiple telephone stations share the same wire-pair is that each one presents a parallel 600 ohm AC impedance in its off-hook state. As a result, both the transmit and receive signal levels are reduced so that users frequently strain to hear each other when more than two are involved in the conversation.

It is therefore an object of the present invention to provide telephone apparatus having improved functionality and is compatible with existing telephone extensions that share a common wire-pair.

It is another object of the invention to provide substantially constant transmit and receive signal levels, regardless of the number of stations at one premises, in a multiple party conferencing call.

SUMMARY OF THE INVENTION

A Multiplexed Data Channel Controlled Telephone System comprises a master telephone station and one or more remote telephone stations that are bridged onto a single wire-pair at a user's business or residential location in a parallel electrical connection. These customer installable stations are merely plugged into any telephone jack and share a telephone wire-pair with existing telephone extensions without interference. Both master and remote stations operate similar to conventional telephone extensions. The term "extension", as used herein, denotes a standard telephone set that can only access an audio frequency telephone channel (typically below 4 kHz). The term "station," as used herein, denotes a telephone set according to the invention that includes frequency multiplexing and demultiplexing equipment used to create a data channel at frequencies that do not interfere with telephone extensions already present on the wire-pair. The data channel is used, for example, to communicate station control information such as line status, ringing and hold.

The master station contains electronic circuitry that interacts with a telephone line switching system (e.g., central office, PBX, or key equipment) for dialing, ring detection, answering, and impedance matching. It exchanges control signals with each remote station via the frequency multiplexed data channel.

Each remote station includes a line interface circuit having a relatively high impedance. Thus when a plurality of remote stations wish to participate in a conferencing arrangement, transmitted and received signal levels are not significantly attenuated.

It is a feature of the present invention that the circuits used for dialing, ring detection, and DC seizure of the telephone line reside only in the master station and may be controlled by any remote station via the multiplexed data channel.

It is another feature of the invention that the remote stations do not appreciably load the received signal since the AC termination impedance is primarily supplied by the master station.

These and other objects and features of the Multiplexed Data Channel Telephone System are discussed in greater detail in the detailed description of the invention, and will be understood more fully when reference is made to the accompanying drawings.

DETAILED DESCRIPTION

The subject Multiplexed Data Channel Telephone System as a "user friendly" enhancement to a residence or business communication system. The System comprises a master station and one or more remote stations that plug into any available wall telephone jack and share the intrapremises telephone wire-pair with existing telephone extensions without interference. Each station requires power from a standard 115 volt source. The master and remote stations provide a number of frequency multiplexed channels above the audio frequency channel (below 4 kHz) used for standard telephone service. A rudimentary system having one master and one remote station enhances existing telephone service by providing two more telephone sets that can access the existing telephone line plus add an intercom channel for internal communications between the newly added stations. Of greater significance, however, are the possibilities offered by such a system. Heretofore, individual telephone sets have not been given control over the combination of one or more voice channels and a data channel; and, it is the combination of voice and data channels that yields immense benefits.

Frequency multiplexed voice channels are used to distribute signals from incoming telephone lines as well as music and intercom signals. The data channel controls access to the various voice channels and delivers line status information to all stations. Functions such as energy management, alarm reporting and appliance control are accommodated by the data channel and made available over the existing wire-pair.

Figure 2:
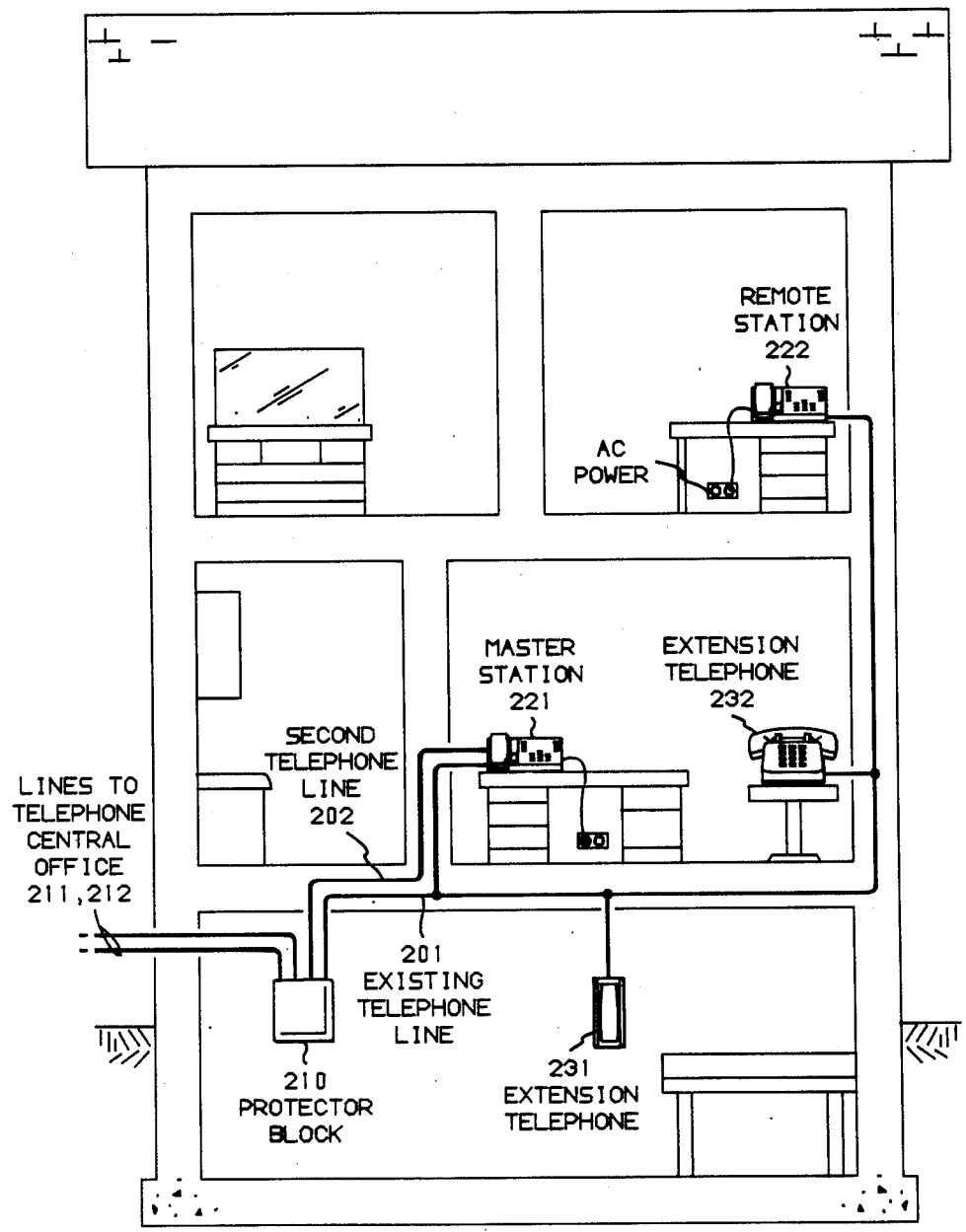
FIG. 2 is a depiction of a customer's premises showing how the present telephone line carrier system may be installed.

FIG. 2 provides a broad view of the System after installation at business or residential premises 200. The System is shown accommodating two independent telephone lines 211, 212 from the telephone line switching system. These lines terminate in protector block 210 which prevents high voltages caused, for example, by lightning from harming people or telephone equipment at premises 200. Prior to the installation of a second telephone line, telephones 231, 232 were the only sets sharing wire pair 201. In accordance with the present invention, master station 221 and remote station 222 are customer installable telephone sets that bridge onto existing telephone wire pair 201. AC power is required at all stations. Stations 221, 222 provide access to Line 1, intercom service between the stations, and a data channel for distributing telephone control information such as line status, keypad activation status, and alerting.

Figure 1:
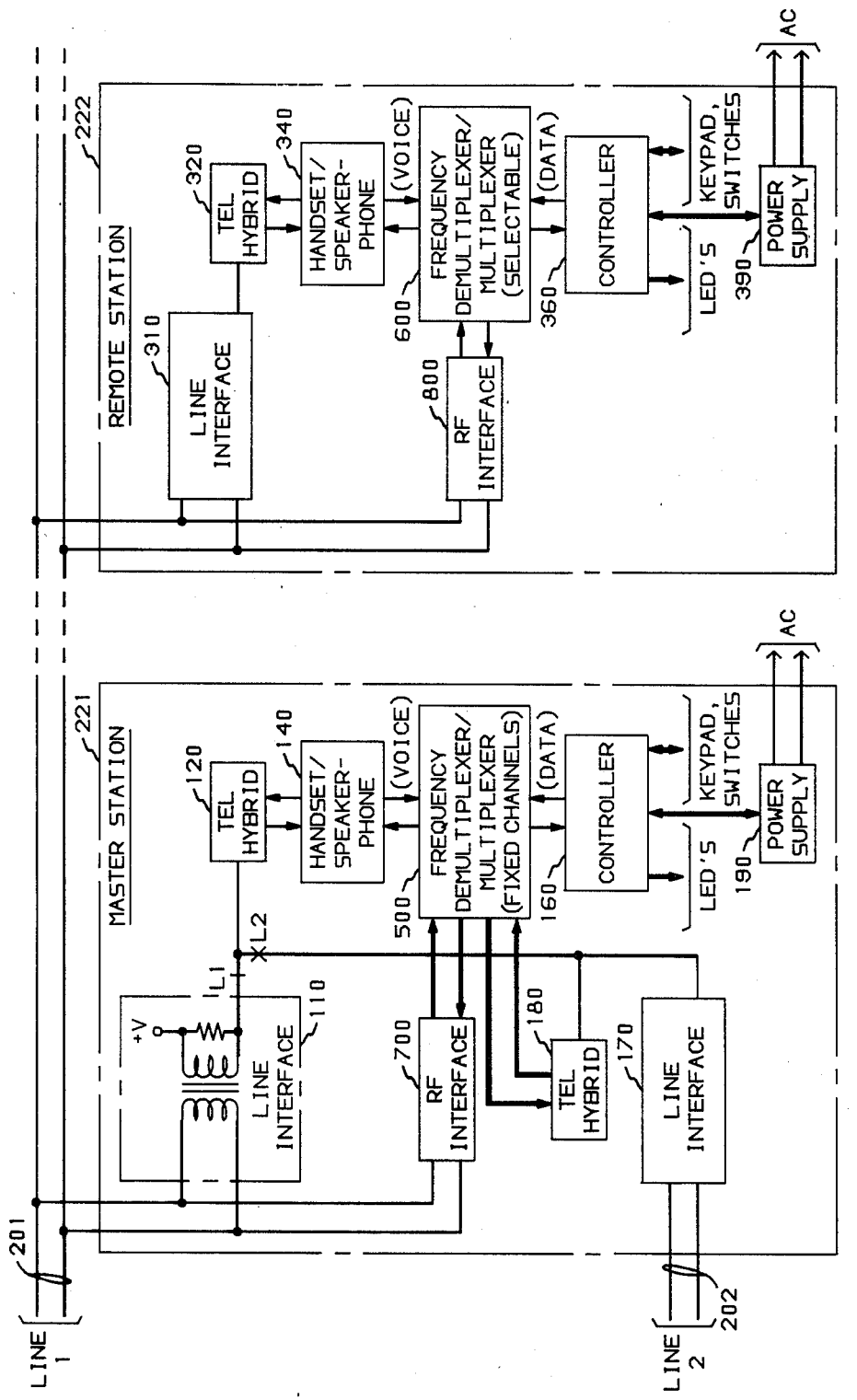
FIG. 1 discloses a block diagram of the multiplexed data channel telephone system in accordance with the invention.

A second line 212 from the central office is connected directly to master station 221 over internal wire-pair 202. Master station 221 terminates Line 2 and provides direct access to it at the master station, or frequency multiplexes it onto Line 1 for access by remote station 222. The block diagram description of the Telephone Line Carrier System, shown in FIG. 1, is hereinafter discussed.

Master station 221 bridges onto existing telephone wire-pair 201 in a parallel electrical connection with conventional telephone plugs and jacks. Power to operate the master station is provided by power supply 190 which delivers its energy from a 115 V AC source. Line 1 interface 110 includes a ringing detector 111 (see FIG. 4) in parallel with wire-pair 201 and a coupling transformer. Components are selected for operation in the audio frequency range where standard telephone service is offered. Line 1 interface 110 communicates with handset/speakerphone unit 140 through telephone hybrid 120 to deliver incoming speech to a loudspeaker and outgoing speech from a microphone to wire-pair 201. A user may optionally select the handset or speakerphone mode of operation. Master station 221 also converts audio frequency signals associated with handset/speakerphone unit 140 to Radio Frequency (RF) signals for distribution over wire-pair 201. In this regard, frequency multiplexer/demultiplexer 500 uses frequency modulation for the voice channels and amplitude modulation for the data channel. RF interface 700 is a hybrid circuit whose components are selected for operation at radio frequencies. It operates to interface a four-wire circuit with two-wire telephone line 201. Handset/speakerphone 140 connects to wire-pair 201 through line interface 110 at audio frequencies, or through RF interface 700 at radio frequencies.

In situations where a second telephone line is needed, line interface 170 terminates wire-pair 202 (Line 2), and is functionally equivalent to line interface 110.

MASTER STATION

Figure 4:
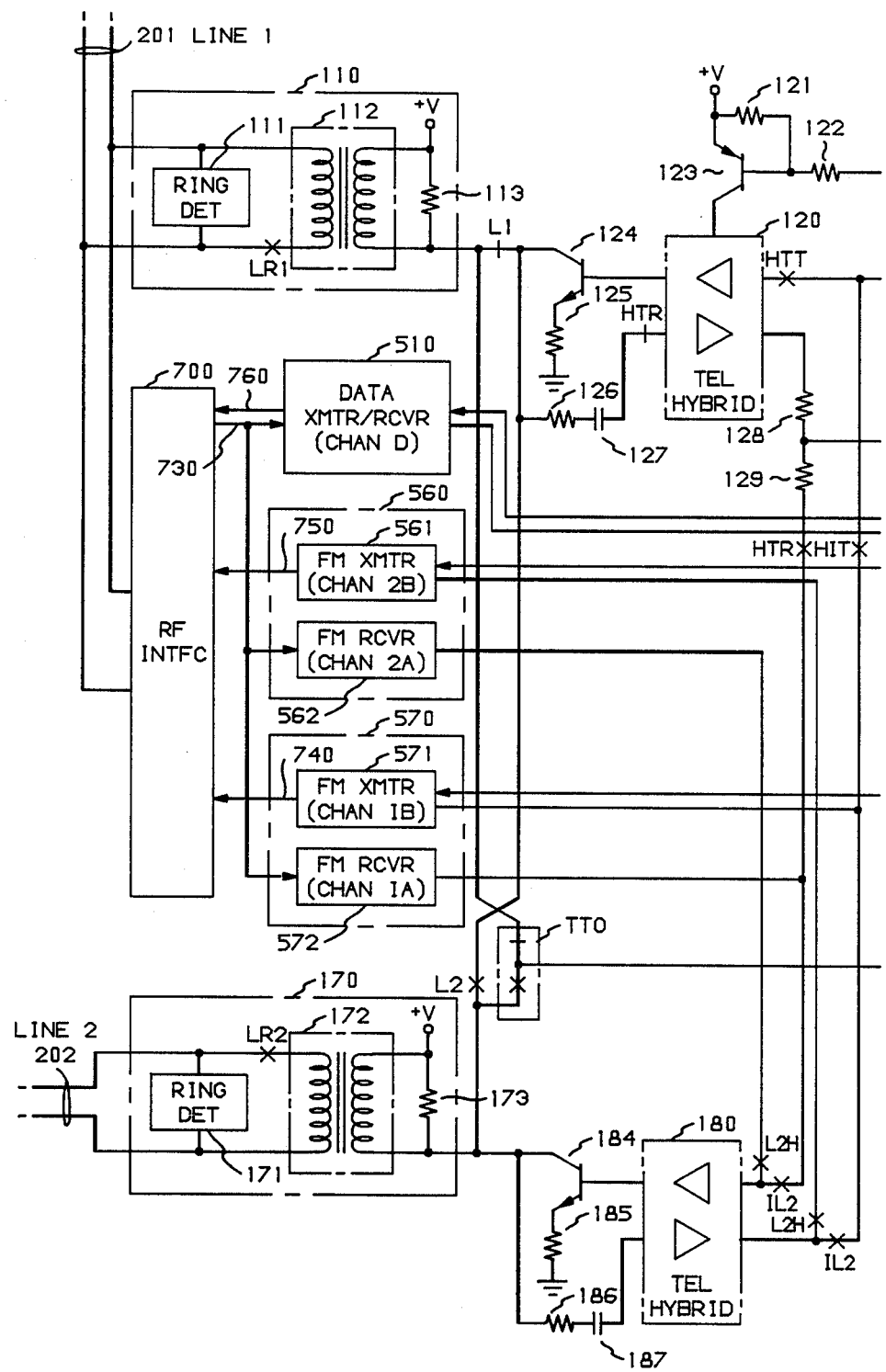
FIGS. 4–5 is an enhanced block diagram of the master station according to the invention.
Figure 5:
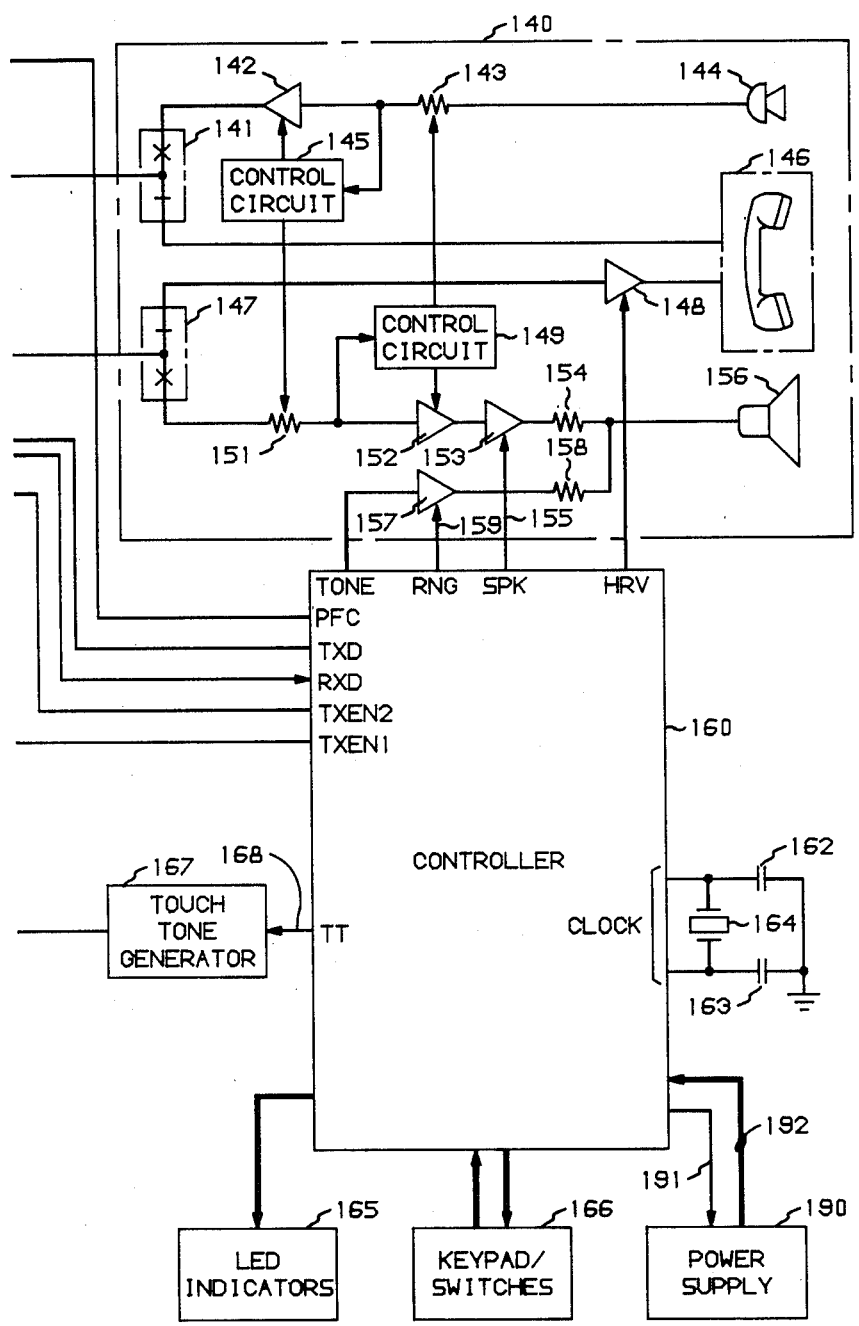

Referring now to FIGS. 4 and 5, wire-pair 201 (Line 1) connects to the master station via line interface 110. Ring detect circuit 111 is responsive to incoming ringing signals and supplies an indication of same to controller 160. Telephone ringing detector circuits are well known and typically comprise a pair of series connected avalanche diodes whose anodes (or cathodes) are tied together. These diodes are in series with a capacitor to eliminate DC. Current flow in the series path is detected by an opto-isolator circuit whose output is electrically remote from high voltage line signals. An example of a commercially available ringing detector circuit is the TCM 1501. Activation of relay contact LR1 completes a DC path on Line 1 such as required for answering. Resistor 113 provides a 600 ohm termination for proper impedance matching.

Switch L1 is shown in its normal "make" state, thus connecting signals from Line 1 to telephone hybrid 120. Resistor 126 is large compared to 600 ohms so as not to appreciably change the termination impedance regardless of the state of L1. Incoming signals to hybrid 120 pass through resistor 126 and DC isolation capacitor 127. Outgoing signals are buffered by transistor 124 and resistor 125 which provide impedance matching to the line and is functionally similar to an emitter-follower circuit.

Line interface 170, telephone hybrid 180, and components 184–187 are associated with wire-pair 202 (Line 2). These circuits operate in the same manner as the corresponding, above-described circuits that service Line 1. Relay contact L2, when operated, interconnects signals from Line 2 to telephone hybrid 120 and hence to handset/speakerphone 140 thereby allowing the master station user to converse over Line 2. Line 1 and Line 2 are interconnected when relay L2 is energized hut relay L1 is not. Conferencing is thereby achieved.

Touch-tone generator 167 includes circuitry for simultaneously generating a pair of tones such as used in conventional touch-tone signaling. Leads 168 from controller 160 select the particular tone pair to be generated in accordance with the particular key depressed in keypad/switch 166. Dual tone multifrequencies signal generators, such as the TP 5088 used in touch-tone signaling, are available in integrated circuit form from a number of manufacturers. An associated crystal operating, for example, at 3.58 MHz provides frequency stability.

Signals from touch-tone generator 167 are selectably applied to Line 1 or Line 2 via transfer switch TTO. To prevent these strong signals from annoying the user, controller 160 operates relay switch HTR during touch-tone dialing.

Figure 9:
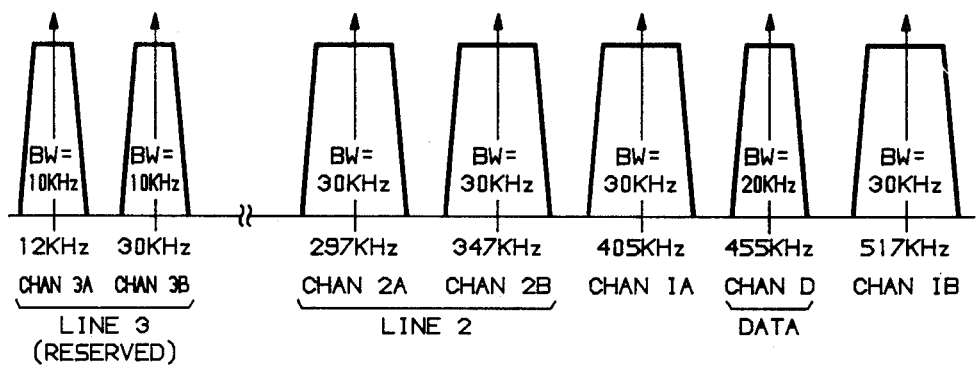
FIG. 9 illustrates the frequency allocation of the radio frequency channels used in the present invention.

Transmission between the various stations in the TLC system proceeds at radio frequencies according to the frequency spectrum allocation set forth in FIG. 9. Data communication takes place in channel D which is centered at 455 kHz. All stations transmit and receive at this frequency using amplitude modulation. Voice communication takes place in channel IA, IB, 2A, 2B and 3A, 3B when, for example, a third telephone line is used. Stations transmit and receive at the frequencies indicated in FIG. 6 using frequency modulation.

VOICE COMMUNICATION

In the preferred embodiment of FIG. 4 the master station includes two pairs of FM transmitters and receivers for communicating with remote stations and bridging them in a conference connection. Each of the FM transmitters and receivers of FIG. 4 operate on fixed pre-assigned channels. Remote stations, on the other hand, have only one FM transmitter and receiver whose operating frequencies are switched between the various ones available depending upon whether the intercom or Line 2 switch is activated, and whether the call is being originated or answered at the remote station. The selection of frequencies is discussed in connection with FIG. 8 and is controlled by the state of control leads IRC, IOC and L2C from controller 360 at the remote station.

FM transmitters 561 and 571 operate with a center frequency of 347 kHz and 517 kHz respectively. These transmitters are enabled when signals TXEN2 and TXEN2 are in their low state. Audio signals presented to the FM transmitters are limited at 0.5 V peak to peak and include a pre-emphasis stage, a modulator such as the LM 567, and a buffer stage for interconnection to RF interface 700. Each of the FM receivers 562, 572 includes a buffer amplifier, channel select filter, demodulator such as MC 3357, and a frequency de-emphasis circuit. Because of the proximity in frequency between channel IA and channel D, a 455 kHz trap is used in the FM receiver of channel IA. A more important specification however is the modulation index—equal to the ratio of the frequency deviation to the highest modulating frequency. FM transmitters 561, 571 operate with a modulation index of 3.3. Since the FM transmitters are directly coupled to the telephone line, the maximum allowable power is set by Part 68 of the FCC Rules. Energy in the frequency band 270 kHz—6 MHz must be less than −15 dBv when averaged over a 2 microsecond interval. The design of such FM transmitters and receivers is well known and, given the specifications provided herein, may be readily constructed using conventional circuit design techniques.

DATA COMMUNICATION

The Data Communication channel is designed to be an inexpensive technique for reliable communications in a potentially noisy environment. The communications protocol is implemented in firmware using the controller of the master station and the remote station. The particular controller has integrated hardware for a dual-edge detection vectored interrupt and an event timer with vectored interrupt on overflow. The data channel uses a half-duplex broadcasting scheme with each station having access to the same channel. To facilitate orderly access to the data channel, all stations look for incoming data before transmitting. The channel must be idle for 12 ms before attempting to transmit a new message.

Figure 10:
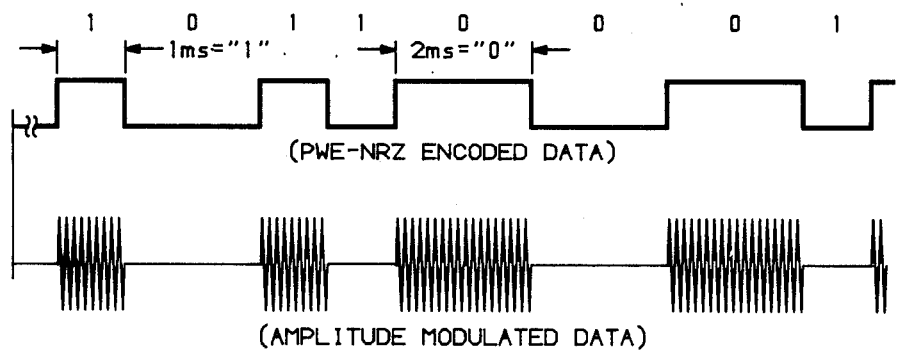
FIG. 10 illustrates various waveforms associated with data transmission using a pulse width encoded-non return to zero format and on/off carrier keying.

The data transmitter is responsive to a binary digital signal for turning a 455 kHz carrier off and on. First, however, the binary digital signal is encoded into a series of pulses having alternating polarity in which a "1" has a duration of 1 ms and a "0" has a duration of 2 ms. Accordingly, if "0" and "1" are equally likely, the nominal signaling rate for the data channel is 667 bits per second. This signaling scheme is known as the Pulse Width Encoded-Non Return to Zero (PWE-NRZ) format. The data receiver converts the presence and absence of 455 kHz carrier into discrete levels and thereafter performs appropriate decoding to recover the binary digital signal. FIG. 10 discloses an exemplary binary digital signal (10110001), that is pulse width encoded and thereafter used to amplitude modulate the 455 kHz carrier. Although on/off carrier keying and half-duplex transmission are used in the preferred embodiment of the Data Communication channel, it is clear that other forms of modulation and transmission may be used within the scope of the invention.

Figure 11:
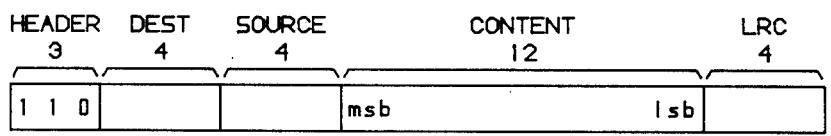
FIG. 11 discloses the telephone line carrier system message packet for the data communications channel.
Figure 12:
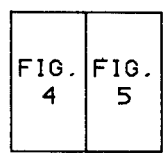
FIG. 12 shows the manner in which FIGS. 4 and 5' interconnect.

FIG. 11 discloses the TLC message packet which is defined to be 27 bits long and broken down into the following fields.

Header: 3 bits, '110' to access the channel and announce the forthcoming message.

Destination: 4 bits, used to identify which receiving stations should consider processing the message. A message can only be processed if the destination address matches that of the station address or if the destination address is '0000', the global addressing value.

Source: 4 bits, identifying the transmitting station. Stations without a programmed address should use '0000'.

Content: 12 bits, containing the informational part of the message. The content may be considered as 3 separate 4 bit fields, Function Code, Data 1, and Data 2.

LRC: 4 bits, resulting from a Longitudinal Redundancy Check calculated over the destination, source, and contents.

All fields are transmitted msb first (see FIG. 11). A message packet can range from 32 ms to 48 ms in duration. Incoming messages are examined if there has been no transition on the data channel for 4 ms. If the correct number of bits has been received and the actual LRC matches the calculated LRC, the next 4 ms interval will be dedicated to looking for a negative acknowledgment (NAK) from any other station. In the absence of a NAK, the message is accepted for destination screening and further processing. If a NAK is detected, the message is discarded. A NAK consists of turning carrier ON for a 2 ms interval starting 4 ms after the completion of the message. The absence of carrier for 12 ms is deemed to be the idle state. After 12 ms of idle, any station may start transmtting—so long as another has not. When collision occurs, each of the stations will complete its message to enforce the collision. The result, then, is that the message will surely be garbled and retransmission will be required. A transmitting station that has its message NAK'd is allowed to retransmit the message after the channel has been idle for 6 ms to 9 ms. The actual time interval is determined by calculating a "pseudo-random" number from 0 to 3 and adding it to the base delay 6 ms. The need for a random re-transmission time arises from message collision considerations when two stations transmit at the same time, both calculating idle time from the same event.

The goal of the data channel message is to provide a way to reach the correct global system state with no more than one data message for each action taken by a user. Data channel messages related to facility use (e.g., status of line 1, line 2 or intercom channel) will utilize function code 0000 to indicate a remote station as the source and 0001 if the master station is the source. Following the function code are two data nibbles (4 bits each), the first specifying those facilities being released, and the second specifying those facilities currently in use. The content portion of FIG. 11 is therefore organized in the following manner:

| Function Code (4 bits) | Data 1 (4 bits) | Data 2 (4 bits) |
|---|---|---|
| 0000/0001 | h + facility ID | c + facility ID | where
- h indicates facility on hold (1), or hung up (0); and
- and, c indicates a change from the previous condition (1), or a reminder of current use (0).

The identification of facilities requires the 3 least significant bits of a nibble.

| Facility | ID |
|---|---|
| None | 000 |
| Line 1 | 001 |
| Line 2 | 010 |
| Line 1/line 2 conference | 011 |
| Intercom | 100 |
| Line 1/intercom conference | 101 |
| Line 2/intercom conference | 110 |
| Line 1, line 2, intercom (hold only) | 111 |

The most significant bit of the Data 1 nibble will indicate how the facility was released, either by being not on hold (1) or by hanging up (0). Any facility put on hold must have the hold message retransmitted every 15 seconds. Any set not receiving a hold message for a "they hold" facility in any 30 second interval will idle that facility.

The most significant bit of the Data 2 nibble will indicate whether this message is a change from the previous global system state or merely a reminder message. Reminder messages must be sent every 15 seconds, with any "they use" facility being idle out if a reminder has not been received within the last 30 seconds. The change bit's only important function is to allow each station to maintain a count of how many stations are off hook on intercom.

Example data channel message are shown below. These messages may be generated by the master or the remote station and convey a class of information different from the above described class. A function code 0010 precedes the following messages:

| Data 1 | Data 2 | Notes |
|---|---|---|
| 0000 | dddd | Dial line 1 req |
| 0001 | dddd | Dial line 2 req |
| 0010 | 0000 | Dial line 1 ack |
| 0011 | 0000 | Dial line 2 ack |
| 0100 | 0010 | Ring line 1 |

-continued

| Data 1 | Data 2 | Notes |
|---|---|---|
|  | 0011 | Ring line 2 |
|  | 0100 | Off hook line 1 ack |
|  | 0101 | Off hook line 2 ack |
|  | 0110 | Cold restart station |
|  | 0111 | Warm restart station |
|  | 1010 | Request global status |
|  | 1100 | line 1 non-system off hook |
|  | 1101 | line 2 non-system off hook |
|  | 1110 | line 1 non-system on hook |
|  | 1111 | line 2 non-system on hook |
| 1000 | addr | Intercom page from master |
| 1001 | addr | Intercom page from remote |
| 11aa | bbcc | Global system status | where:
- aa indicates global intercom status of idle, ringing, holding or in use;
- bb indicates global line 1 status of idle, ringing, holding, or off hook;
- cc indicates global line 2 status of idle, ringing, holding, or off hook;
- addr indicates intercom station address (1010 for a broadcast page); and
- dddd indicates dial value

DATA TRANSMITTER/RECEIVER

Figure 6:
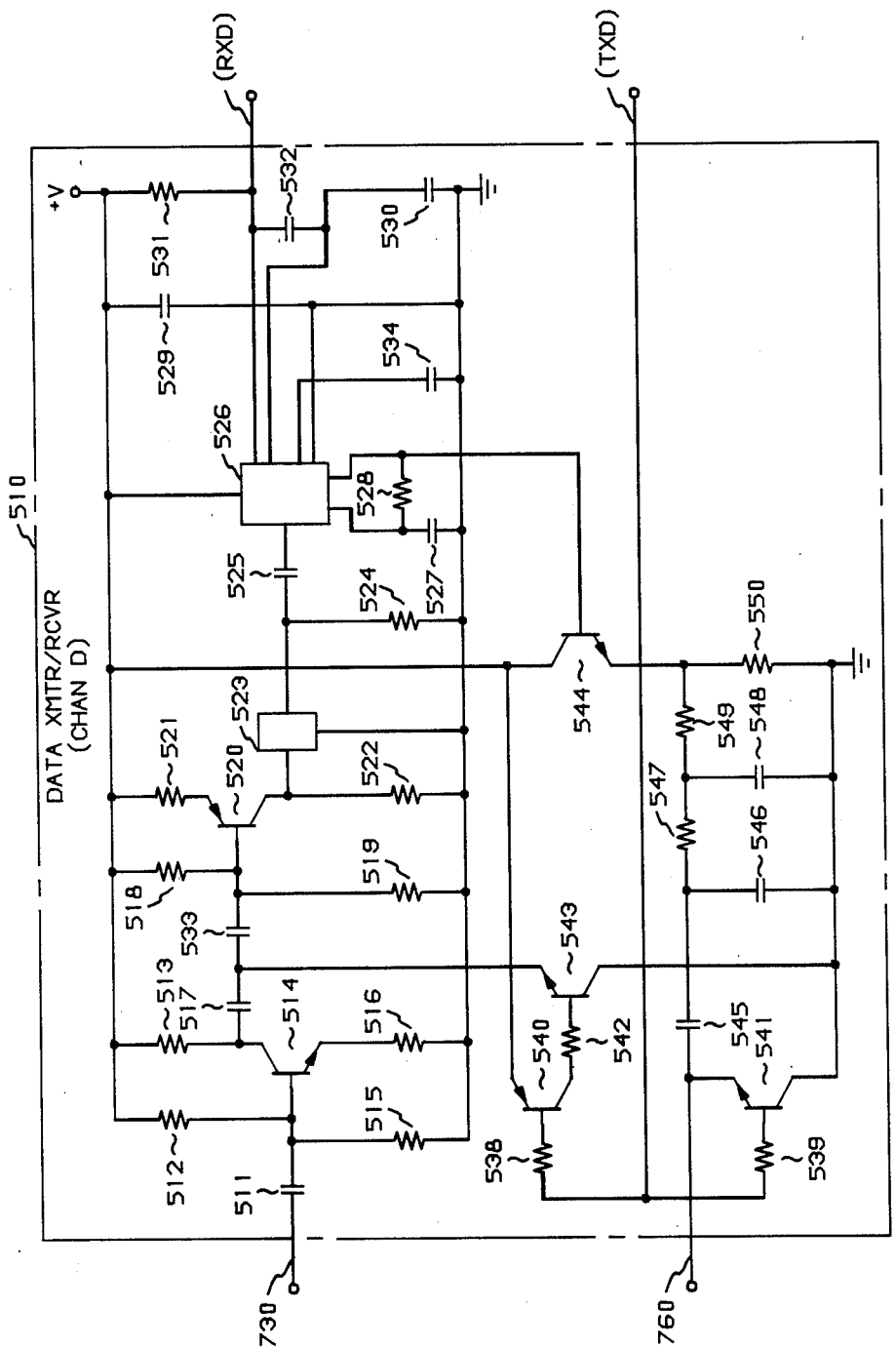
FIG. 6 is a schematic diagram of a data transceiver used in the frequency modulation and demodulation of digital data exchanged between master and remote stations.

FIG. 6 discloses a detailed schematic of data transceiver 510 used in a preferred embodiment of the invention. This transceiver transmits and receives an amplitude modulated 455 kHz carrier wave. A digital data signal, encoded in the PWE-NRZ format of FIG. 10 and organized according to the transmission order of FIG. 11, is present on input lead TXD and used to control transistor 541 to turn on and turn off a 455 kHz carrier wave present on output lead 760. The carrier wave is generated by phase-locked loop 526, an output of which is presented to transistor 544, connected in the emitter follower configuration, for driving a filter circuit comprising components 545A–550. The output of phase-locked loop 526 is a square wave at the 455 kHz rate which is filtered to produce a sine wave at output 760. The center frequency of the phase-locked loop is determined by capacitor 527 and resistor 528. Dual use of component 526 is achieved by "disconnecting" input signals when carrier is being transmitted (i.e., when TXD="0"). Transistors 540 and 543 cooperate to ground the junction between capacitors 517 and 533 and thereby disconnect the input signal from phase-locked loop 526 when TXD="0".

Data transceiver 510 also operates as a receiver of amplitude modulated 455 kHz carriers waves. Input signals are received on lead 730 and amplified by a two-stage transistor circuit comprising components 511–522 and 533. Component 523 is a commercially available four-element ceramic filter having a 25 kHz bandwidth centered at 455 kHz. This filter is broad enough to pass the spectrum of the amplitude modulated signal. Components 524 and 525 are used in coupling the filtered signal to an input of phase-locked loop 526 for demodulation. The demodulated output signal appears at the junction of resistor 531 and capacitor 532 and is available on output lead RXD. The components directly associated with component 526 are representative of the manufacturer's specifications for this commercially available device which finds use both as a carrier oscillator and as a tone decoder. An acceptable device is the LM 567 tone decoder.

GENERAL CIRCUITS

Referring once again to FIGS. 4 and 5, handset/speakerphone 140 includes circuitry for switching between handset 146 and loudspeaking telephone components including microphone 144 and loudspeaker 156. Transfer switches 141 and 147 are shown in their deactivated state interconnecting handset 146 with either (i) telephone hybrid 120, (ii) telephone hybrid 180 or (iii) FM transmitter 571 and receiver 572. Amplifier 148 offers two volume levels through controller 160 in response to a volume control switch.

When the speakerphone mode of operation is selected, controller 160 simultaneously activates transfer switches 141 and 147 to disconnect handset 146 from an outgoing line, and connect microphone 144 and loudspeaker 156 in its place. In its quiescent state, the loudspeaking telephone set resides neither in the transmit nor the receive mode. The presence of sufficient transmit signal energy causes the transmit channel gain to increase and the receive channel gain to decrease. The presence of sufficient receive signal energy causes the reverse action. The net loop gain of the transmit and receive channels is designed to be less than unity (assuming moderate loss between microphone 144 and loudspeaker 156) in order to avoid oscillation. Loop gain is the same before and after switching to assure maximum gain consistent with stable operation. The transmit channel includes microphone 144, attenuator 143 and amplifier 142. The receive channel principally includes attenuator 151, amplifier 152 and loudspeaker 156. Control circuit 145 is responsive to signal energy in the transmit channel exceeding a predetermined threshold. When the threshold is exceeded, control circuit 145 simultaneously increases both the gain of amplifier 142 and the loss of attenuator 151. Similarly, control circuit 149 is responsive to energy in the receive channel exceeding a predetermined threshold. When the threshold is exceeded, control circuit 149 simultaneously increases both the gain of amplifier 152 and the loss of attenuator 143. In the preferred embodiment, each of the amplifiers and attenuators are arranged to switch 20 dB of gain when activated. By switching only 20 dB in each channel (transmittter and receiver) the time required to "turn around" a speakerphone is minimized and the quality of four-wire transmission is substantially achieved over a two-wire circuit.

Amplifier 153 offers eight different gain settings controllable over lines 155 (3 leads) from the controller. Loudspeaker 156 is also used to provide a modulated 750 Hz for both intercom alerting and normal Line 1 or Line 2 ringing. Amplifier 157 receives an alerting signal from controller 160 which also supplies a signal for selecting between two ringer volume levels over line 159. Resistors 154 and 158 are used to buffer the signals between amplifiers 153, 157 and loudspeaker 156.

Controller 160 is a 4-bit microprocessor having 8K of ROM, such as the NEC 75108, that controls all aspects of the master station in accordance with an internally stored program. A source of stability for clock signals is supplied by resonator 164 and capacitors 162, 163. Resonator 164 is a color burst crystal, such as used in conventional television receivers, having a nominal resonant frequency of 3.58 MHz.

Figure 3:
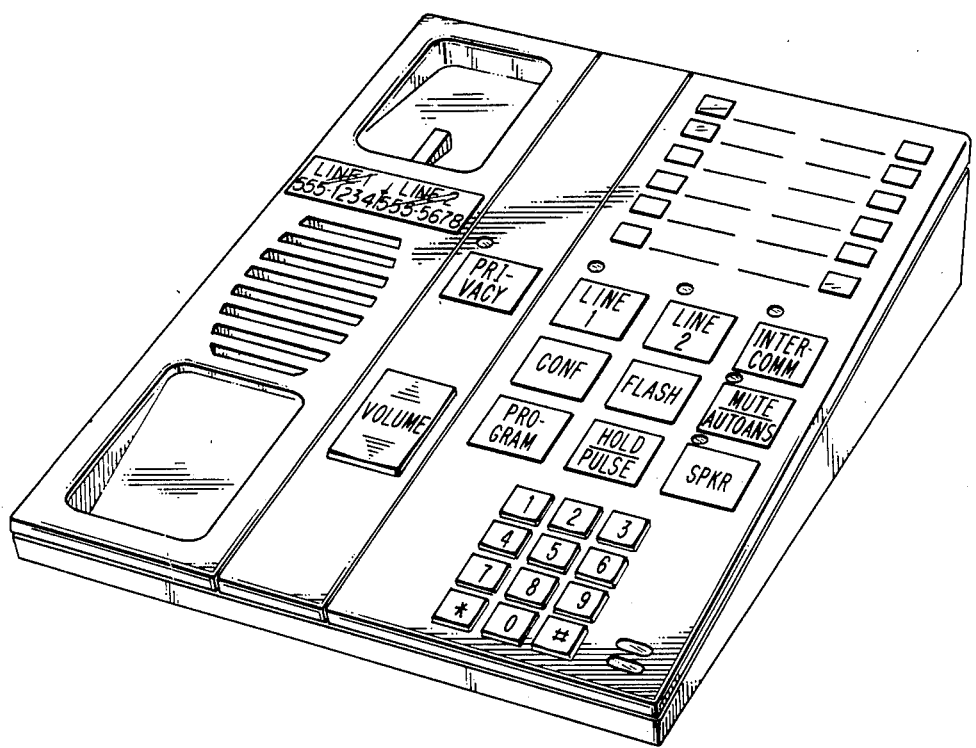
FIG. 3 is a drawing of the base for a master or remote station illustrating various features and functions that are available.

Light Emitting Diodes (LED), collectively designated 165, are illuminated under the control of controller 160. Indications are variously provided to indicate the status of line 1, line 2, intercom, speaker, hands-free answer during intercom (Auto Answer) mode, privacy mode and backup battery status. The state of the keypad contacts and other switches, collectively designated 166 are periodically sampled by controller 160. The various LEDs and switch contacts whose state is controlled or determined by controller 160 are shown in FIG. 3 and include the handset switch in the earpiece cavity of the station.

Power supply 190 includes a wall-mounted transformer and circuitry for providing a regulated and filtered +5 volt supply to controller 160 and other using components. Several sources of +5 volts are provided by this supply, each having various degrees of filtering depending on the using equipment. Two of these sources are backed up with a +9 volt battery and are used in providing a non-interruptible source of power to certain critical areas such as the repertory telephone number memory.

When the station goes off-hook, a "battery test enable" signal is delivered to power supply 190 over lead 191. In response, power supply 190 provides an indication to controller 160 that the battery voltage exceeds (or is less than) a predetermined threshold. When the battery is absent or low, controller 160 causes a particular LED to flash—thereby warning the user that stored telephone numbers and basic telephone service may be lost in the event of a power failure. Another one of leads 192 provides an indication of power failure. During power failure, the PFC lead from the controller causes power to be applied to telephone hybrid 120 only when necessary and thus minimizes battery drain. Components used in controlling the application of power include resistors 121,122 and transistor 123. During normal operation the PFC lead is in its low state and power is constantly supplied to telephone hybrid 120.

Figure 7:
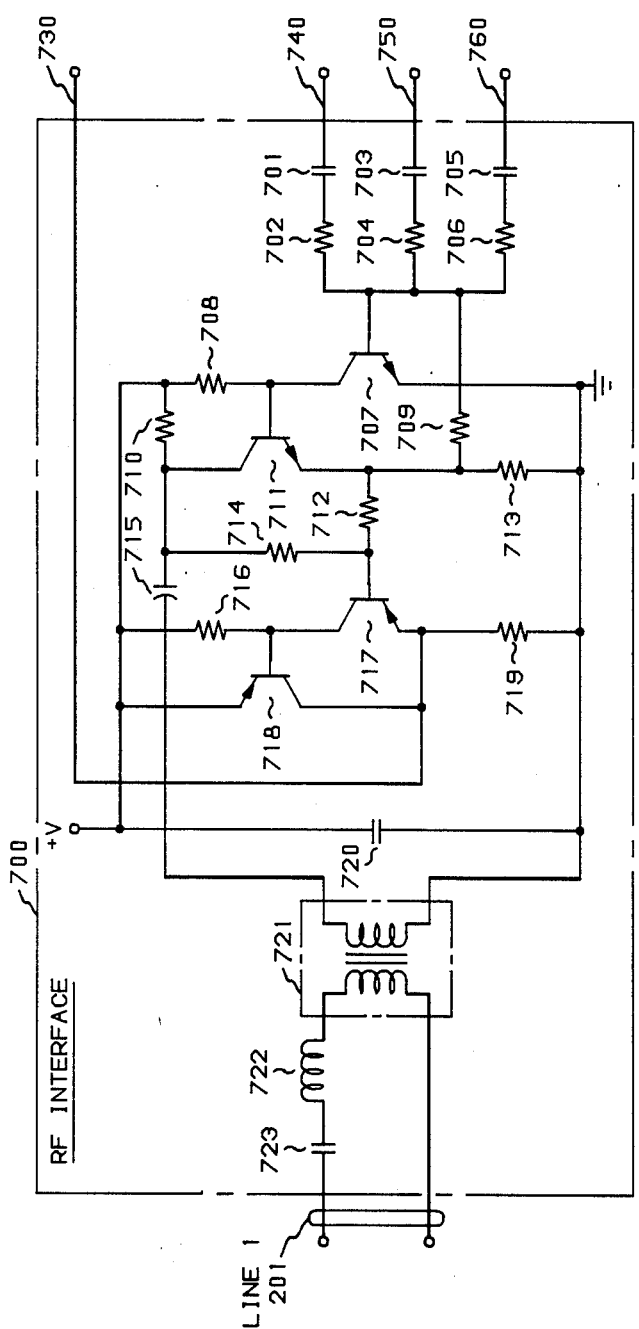
FIG. 7 is a schematic diagram of an RF interface used to interconnect frequency multiplexed signals with the telephone wire-pair.

FIG. 7 discloses a detailed schematic of RF interface 700 of the master station. It performs the function of a hybrid circuit at radio frequencies whereby transmit and receive signals are shuttled to and from Line 1. RF interface 700 receives signals from FM transmitter 571 over lead 740, from FM transmitter 561 over lead 750, and from data transmitter/receiver 510 over lead 760. Each of these RF inputs are additively combined in transistor 707 via components 701–706 with DC removed by capacitors 701, 703 and 705. Feedback resistor 709 in combination with resistors 702, 704 and 706 set the gain of the input stage of interface 700. The signal at the collector of transistor 711 is coupled to the primary of transformer 721 through capacitor 715. Transformer 721 is a 1:1 transformer suitable for operation at the RF frequencies of interest. Inductor 722 and capacitor 723 are selected to resonate at approximately 455 kHz so that looking into the primary of transformer 721 the impedance of Line 1 (approximately 50 ohms) is seen. It is noted that RF interface 700 operates as a hybrid at radio frequencies. Inductor 722 and capacitor 723 are tuned for 455 kHz because the data channel transmits and receives at that frequency; so it's more important that the hybrid be balanced at that frequency in order to distinguish transmit and receive signal energy.

Looking into the secondary of transformer 721 from Line 1, capacitor 723 is selected to provide approximately 30 kilohms at 3000 Hz. RF signals present on Line 1 pass through transformer 721, capacitor 715, resistor 714, Darlington pair 717, 718 and finally out lead 730. The magnitude of resistors 712 and 714 are selected to cancel sidetone by combining portions of the inverted and non-inverted outgoing signals present at the emitter and collector terminals of transistor 711.

REMOTE STATION

Figure 8:
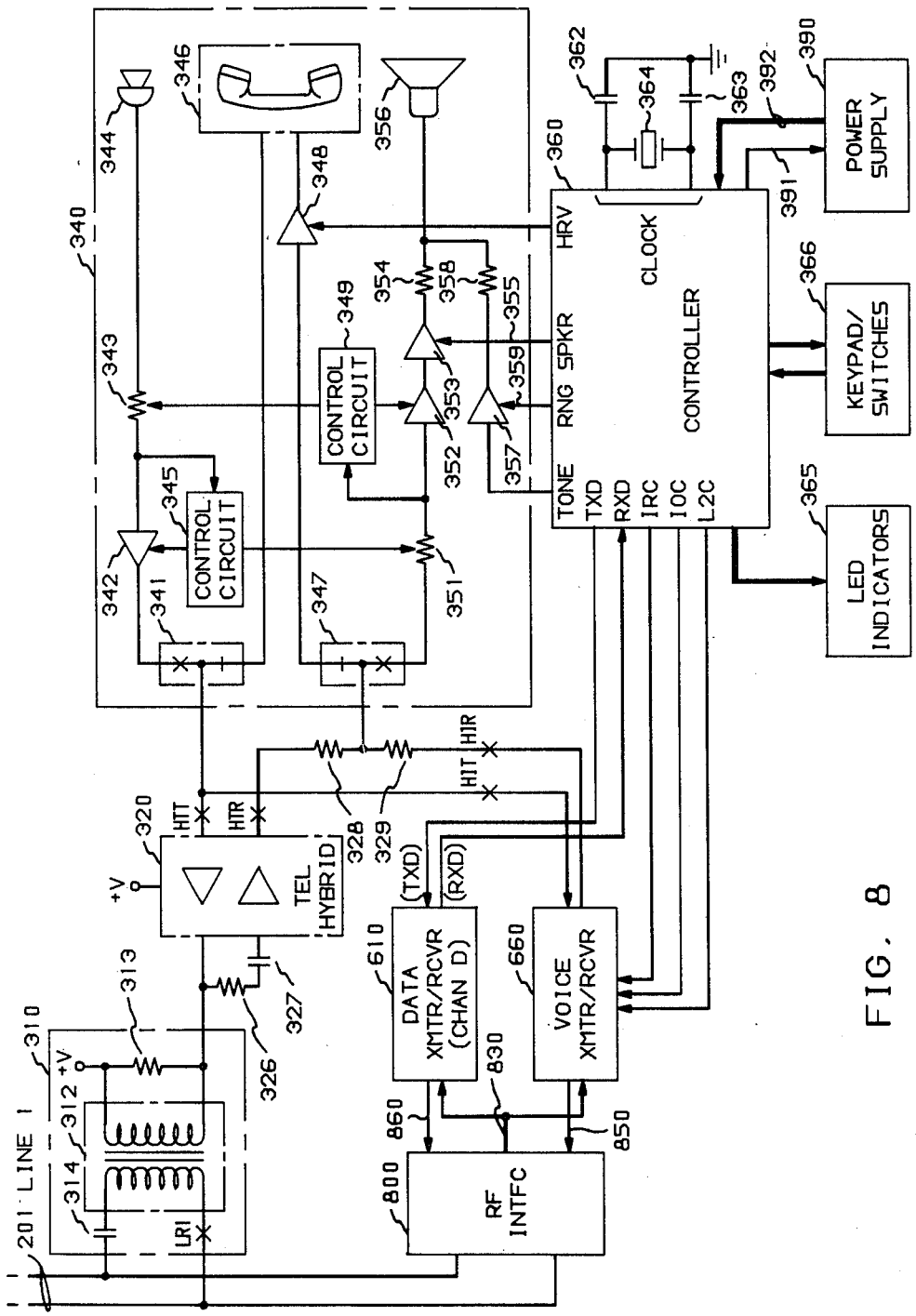
FIG. 8 is an enhanced block diagram of the remote station according to the invention.

Referring now to FIg. 8, wire-pair 201 (Line 1) connects to the remote station through line interface 310 in a parallel electrical connection. Such connections make the Telephone Line Carrier system easily installable by a customer using existing telephone jacks at her premises. Capacitor 314 precludes DC loading when relay LR1 is operated. In order for the remote station to answer an incoming call on wire pair 201 the following events occur. Ringing is detected at the master station which then broadcasts this information to all remote stations via the data channel on wire pair 201. Data transmitter/receiver 610 responds to information in the 455 kHz frequency range, performs amplitude demodulation and delivers the demodulated data over the RXD lead to controller 360. Audible alerting at the remote station is provided when controller 360 delivers a modulated 750 Hz tone to amplifier 357 and hence to loudspeaker 356. One of the group of switches 366 is the switchhook contact, which when activated is sensed by controller 360. In response, relay LR1 (part of interface 310) is operated. Operation of LR1, however, does not cause the telephone call to be answered since capacitor 314 precludes DC flow through the primary of tranformer 312. Answering is accomplished at the remote station when controller 360, responsive to the operation of the switchhook (part of keypad/switches 366), transmits this information over lead TXD to data transmitter/receiver 610 and RF interface 800 to the master station. Upon receiving an indication that the remote station is attempting to answer the telephone call, the master station causes its LR1 relay (part of line interface 110) to operate and draw the necessary DC current from the telephone line switching system and thereby answer the incoming call. Resistor 113, shown in FIG. 4, provides the desired 600 ohm AC terminating impedance for the incoming telephone line. This is accomplished in the master station even though it remains in the on-hook state.

Returning to FIG. 8, once line relay LR1 operates, AC terminating impedance 313 is presented to wire-pair 201. In a preferred embodiment, resistor 313 is selected to be 6000 ohms. This value is selected to be large in comparison with the 600 ohm parallel impedance of the master station. As a result, remote stations advantageously do not attenuate the transmit or receive signals to any significant extent while in the off-hook state. Multiple conferees, therefore, each receive a signal level equivalent to the non-conference call situation. Furthermore, since only the master station performs the dialing function, it is important that the remote stations be of high dc impedance so that dial-pulse dialing can be used. It is noted that both the remote station and the master station are off-hook when the remote station commands the master station to perform dialing.

Telephone hybrid 320 performs two-wire to four-wire conversion in the voice frequency band identical to telephone hybrid 120 of the master station discussed hereinabove. Contacts HTT and HTR are operated by controller 360 to enable voice communication between handset/speakerphone 340 and wire-pair 201 when the remote station wishes to access Line 1 at voiceband frequencies. Contacts HIT and HIR are operated to enable voice communication between handset/speakerphone 340 and wire-pair 201 when the remote station wishes to access Line 1 at radio frequencies. Controller 360, responsive to the state of keypad/switches 366 and data received from the data channel on input RXD, implements the selection of radio frequency channels at the remote station in accordance with the state of outputs IRC, IOC, and L2C. These outputs are delivered to voice transmitter/receiver 660 which comprises a frequency modulator and a frequency demodulator whose operating frequencies are selectable. The following table sets forth the mutually exclusive states of outputs IRC, IOC, L2C and the corresponding selection of transmit and receive channels:

| CONDITION | TRANSMIT CHANNEL | RECEIVE CHANNEL |
|---|---|---|
| IRC = "1" | 1B | 1A |
| IOC = "1" | 1A | 1B |
| L2C = "1" | 2A | 2B |

IRC="1" represents the Control signal whereby the remote station Receives a call on the Intercom channel; IOC="1" represents the Control signal whereby the remote station Originates a call on the Intercom channel; and L2C="1" represents the Control signal whereby the remote station originates or receives a call on Line 2.

Descriptions of other aspects of the remote station shown in FIG. 8 are identical to the corresponding description of the same components in connection with the master station—with the exception that telephone hybrid 320 does not include battery backup. Thus, in the event of power loss, remote stations are inoperative.

Both master and remote stations include a microprocessor having a stored program for controlling its functions. The program is interactive with signals supplied by various hardware items such as ring detector 111, touch-tone generator 167, keypad/switches 166, 366 and the Data Xmtr/Rcvr 510, 610. Shown below, in pseudo-code, are software control algorithms for the master station to manage ringing, dialing, and switchhook control utilizing a data channel to provide full phone capabilities to itself as well as remote stations that do not have ring detect, dialer, or switchhook hardware. These algorithms are coded in the C Programming language for which a more detailed explanation is available in the textbook entitled *The C Programming Language*, Brian W. Kernighan and Dennis M. Ritchie, 1978, Prentice-Hall, Inc.

T. N. Comerford, et    2-1-1

```
#define YES 1        #define LINE1 0      #define MASTER 1
#define NO  0        #define LINE2 1      #define REMOTE 1
#define TRUE 1
define FALSE 0

/* hardware input requests to subroutine INPUT */
#define TT_DP_SETTING 0   /* return dial mode setting */
#define LINE_1_RELAY 1    /* return line 1 relay position */
#define LINE_2_RELAY 2    /* return line 2 relay position */
```

```
/* hardware input return values from subroutine INPUT */
#define TT     1      /* dial mode is Touch-Tone */
#define DP     0      /* dial mode is dial-pulse */
#define OPEN   1      /* line relay not active, line is idle */
define CLOSED 0      /* line relay is active, line is in use */ int station_address;

int ring_1_req;
int ring_2_req;
int dialer_busy_line_1;
int dialer_busy_line_2;
int dialing_complete_line_1;
int dialing_complete_line_2;
int line_1_master;
int line_2_master;
int dp_1_override;
int dp_2_override;
int line_1_ack_req;
int line_2_ack_req;
int tx_type;         /* type of message being transmitted */
                     /* Allowed values for tx_type are: */ define  UPDATE      0      #define  RING_L2     4
    #define  L1_DIAL_ACK 1      #define  STATUS_CHG  5
    #define  L2_DIAL_ACK 2      #define  MASTER_DIAL 6
    #define  RING_L1     3 int transmitter_busy;
int transmitter_done;
int message_transmitted;
int message_received;

char receiver_buffer[6];
char transmit_buffer[6];

/* the transmit and receiver buffers have the
 * following message components stored:
 * 0   destination address
 * 1   source address
 * 2   function code
 * 3   data 1
 * 4   data 2
 * 5   longitudinal redundancy check
 */
main(){
      if(is_ringing(LINE1))
           ring_1_req = YES;
      if(is_ringing(LINE2))
           ring_2_req = YES;

if(ring_1_req && !transmitter_busy){
           ring_1_req = NO;
           message_to_transmit(RING_L1);
      } if(ring_2_req && !transmitter_busy){
           ring_2_req = NO;
           message_to_transmit(RING_L2);
      } if(transmitter_done){
           transmitter_done = NO;
           transmitter_busy = NO;
           switch(tx_type){
           case STATUS_CHG:
```

```
            if(message_transmitted)
                    /* send message transmitted
                     * signal to upper level code.
                     */
                    ;
            else if(!message_received)
                    /* send message undelivered
                     * signal to upper level code.
                     */
                    ;
            else{ /* process received message first */
                    transmitter_done = YES;
                    transmitter_busy = YES;
            }
            break;

case L1_DIAL_ACK:
            dialer_busy_line_1 = NO;
            break;

case L2_DIAL_ACK:
            dialer_busy_line_2 = NO;
            break;

case RING_L1:
            /* send line 1 ring signal to
             * upper level code
             */
            break;

case RING_L2:
            /* send line 2 ring signal to
             * upper level code
             */
            break;

case MASTER_DIAL:
            dial_request(transmit_buffer[4], transmit_
            buffer[3], MASTER);
            break;

default:
            break;
        }
    } if(message_received){
        message_received = NO;
        if(receiver_buffer[2] == 0){
/* a data message relating to the use of the
 * telephone facilities, line 1, line 2, or
 * intercom, has been received.  This could be
 * a reservation for use, or a release of a
 * facility previously being used by requesting a
 * hang-up or to put the line on hold.  Possible
 * reactions by the upper level code might be:
 * If a remote requests use of a line
 *
 * message_to_transmit(UPDATE, '2', '4', line+'4');
 *
 * If a remote hangs up a line
 *
 * hang_up(line);
 *
 * The master keeps track of all usage status so
 * that the line switches, voice paths, and status
 * indicators can be properly controlled to reflect
 * the current configuration of the system.
```

```
    */
;
        } else if(receiver_buffer[2] == 2){
                switch(receiver_buffer[3]){
                case 0:     /* line 1 dial request */
                            dial_request(receiver_
                            buffer[4], LINE1, REMOTE);
                            break;

case 1:     /* line 2 dial request */
                            dial_request(receiver_
                            buffer[4], LINE2, REMOTE);
                            break;

case 9:     /* page received */
                            /* send intercom page signal
                             * to upper level code.
                             */
                            break;
                }
            }
        } if(dialing_complete_line_1){
                dialing_complete_line_1 = NO;
                if(line_1_master){
                    dialer_busy_line_1 = NO;
                    /* send dial complete input to upper
                     * level code
                     */
                }
                else
                    line_1_ack_req = YES;
            } if(dialing_complete_line_2){
                dialing_complete_line_2 = NO;
                if(line_2_master){
                    dialer_busy_line_2 = NO;
                    /* send dial complete input to
                     * upper level code
                     */
                }
                else
                    line_2_ack_req = YES;
            } if(line_1_ack_req && !transmitter_busy){
                line_1_ack_req = NO;
                message_to_transmit(L1_DIAL_ACK);
            } if(line_2_ack_req && !transmitter_busy){
                line_2_ack_req = NO;
                message_to_transmit(L2_DIAL_ACK);
            }
```

Other code that is called in the main loop would be key pad scanning and switchhook transition detection that would cause this station to go off hook on a line or dial. Examples of this would be if this station tried to go off hook on a currently idle line 1. The action would be buffered until the transmitter is idle, at which time a line 1 in use reservation message would be sent.

```
message_to_tx(STATUS_CHG, '1', '0', '9');
```

If the successful transmission of the above message is confirmed, then the station will go off hook. However, if a data channel message is received while the status change message was in the transmitter, then the message will be returned to the upper level code untransmitted. If the newly received message does nothing to make line 1 unavailable, the off hook attempt will be repeated. If this station was off hook on line 1 or 2 and dialing keys were pressed on the keypad, the following code would be invoked when the transmitter was idle:

```
message_to_tx(MASTER_DIAL, 0, line, digit_to_dial);
} dial_request(digit_to_dial, line, master)
int digit_to_dial;
int line;        /* line to dial on */
int master;      /* flag to differentiate master from remote */
/* called from feature code in main loop */
{
        if(line == LINE1){
            if(dialer_busy_line_1)
                return  /* error, all dialing must
                         * wait for ack
                         */
            if(INPUT(LINE_1_RELAY) == OPEN)
                return; /* error, line not being used */
            if(digit_to_dial == '*' && INPUT(TT_DP_
            SETTING) == DP && !dp_1_override){
                dp_1_override = YES;
                digit_to_dial = '0';
            }
            dialer_busy_line_1 = YES;
            line_1_master = master;
            /* the dial request will be detected in
             * the dialing interrupt and processed.
             */
        }
        else{
            if(dialer_busy_line_2)
                return; /* error, all dialing must wait for ack */
            if(INPUT(LINE_2_RELAY) == OPEN)
                return;  /* error */
            if(digit_to_dial == '*' && INPUT(TT_DP_
            SETTING) == DP && !dp_2_override){
                dp_2_override = YES;
                digit_to_dial = '0';
            }
            dialer_busy_line_2 = YES;
            line_2_master = master;
            /* the dial request will be detected in the dialing
             * interrupt and processed.
             */
        }
} hang_up(line)
int line;        /* line being hung up */
/* called from upper level code whenever hang-up is detected
 * either locally or through a data channel message.
 */
{
        if(line == LINE1){
```

```
                dp_1_override = NO;
                /* reset any line 1 dialing timers and flags */
        }
        else{
                dp_2_override = NO;
                /* reset any line 2 dialing timers and flags */
        }
} dialing(){
  /* a timer interrupt driven background process that controls the
   * dialer hardware for both line 1 and line 2.  The dial request
   * is timed as either a dial-pulse or Touch-Tone request,
   * including the interdigit time.  Interdigit times for requests
   * from Remote stations are shortened appropriately to take into
   * account the data channel transmission delays.  When dialing is
   * complete, the signal is passed back to the foreground process
   * as follows:
   *
   *    if(dialing_is_done(LINE1))
   *            dialing_complete_line_1 = YES;
   *    if(dialing_is_done(LINE2))
   *            dialing_complete_line_2 = YES;
   *
   * Since there is only one touch-tone generator, some dial
   * requests are delayed until the generator is available.
   * A dial request of 0 can be used force the dialing code to
   * signal an immediate complete.  Valid dial requests are
   * 1-10, *, #, pause, and flash.
   */
} message_to_transmit(mess_type, func_code, data_1, data_2)
int mess_type;      /* message type to transmit */
int func_code;      /* message content */
int data_1;
int data_2;
/* called whenever there is a message to transmit, and the
 * transmitter is not busy.
 */
{
        int i;
        static char message_text[7][5] = {
                "0sxyz",        /* status update */
                "0s220",        /* line 1 dial ack */
                "0s230",        /* line 2 dial ack */
                "0s242",        /* ring line 1 */
                "0s243",        /* ring line 2 */
                "0sxyz",        /* status change */
                "0s2yz"         /* master dial request */
        };

if(transmitter_busy)    /* error, all calls must
                return;          * check busy flag first
                                 */
        transmit_buffer[5] = 0; /* initialize lrc */
        for(i = 0; i < 5; ++i){
                switch(message_text[mess_type][i]){
                case 's':
                        transmit_buffer[i] = station_address;
                        break;
                case 'x':
                        transmit_buffer[i] = func_code;
                        break;
                case 'y':
                        transmit_buffer[i] = data_1;
                        break;
```

```
            case 'z':
                transmit_buffer[i] = data_2;
                break;
            default:
                transmit_buffer[i] = message_text[mess_type][i];
                break;
            }
            transmit_buffer[5] ^= transmit_buffer[i];
        }
        tx_type = mess_type;
        /* disable receiver */
        if(message_received && tx_type == STATUS_CHG){
            /* process received message before
             * transmitting this type of message.
             */
          message_transmitted = NO;
          transmitter_done = YES;
        }
        transmitter_busy = YES;
        /* enable receiver */
} transmitter(){
 /* a timer interrupt driven background process that transmits
  * a message on the data channel. The data link protocol is
  * implemented here. A header is added to the message in the
  * transmit buffer, and when the data channel is idle, the
  * message is transmitted. If transmission was successful,
  * the following signals are returned:
  *
  *   if(is_done_transmitter()){
  *       transmitter_done = YES;
  *       message_transmitted = YES;
  *   }
  *
  * If a transmission is unsuccessful, retransmission is
  * attempted. The transmitter also interacts with the
  * receiver to assure proper protocol.
  */
}
receiver(){
 /* an edge trigger interrupt driven background process that
  * decodes messages from the data channel. The data link
  * protocol is enforced here, and signals are passed to other
  * processes that need to know about data channel activity.
  * If this station is transmitting, a message corrupted signal
  * is passed to the transmitter if necessary so that the
  * transmitter will resend the message. When a message is
  * received that passes all the protocol requirements, and the
  * destination address either matches this stations or is
  * global, a message is moved into the receiver buffer and a
  * signal is passed back to the foreground process:
  *
  *   if(is_received_message()){
  *       message_received = YES;
  *       if(transmitter_busy && tx_type == STATUS_CHG){
  *           transmitter_done = YES;
  *           message_transmitted = NO;
  *       }
  *   }
  *
  * The receiver also receives timeout signals from other
  * processes that allow it to perform the required data
  * channel protocol timeouts.
  */
}
```

```
is_ringing(line)
int line;       /* variable designates line to test */
{
/* This subroutine is a hardware interface that returns TRUE
 * if the line specified by the passed parameter is ringing,
 * and FALSE otherwise.  Only one TRUE value should be
 * returned for each ringing cycle.
 */
}

INPUT(input_request)
int input_request;
/* this subroutine accepts hardware input requests and returns
 * the current state of the requested input.
 */
{
    int return_value;

/* return_value set to state of requested input */ return(return_value);
}
```

Software control algorithms for the remote station to manage ringing, dialing, and switchhook control utilizing a data channel to provide full phone capabilities. The remote station depends on the master station to draw dc line current to take a line off hook, to dial, and to inform it when ringing is present on a line. This is accomplished by using messages over a data channel.

```
#define YES 1           #define LINE1 0
#define NO  0           #define LINE2 1
#define TRUE 1
define FALSE 0 int station_address;

int tx_type;            /* type of message being transmitted */
                        /* Allowed values for tx_type are: */
#define  UPDATE      0
define  STATUS_CHG  5 int transmitter_busy;
int transmitter_done;

int message_transmitted;
int message_received;

char receiver_buffer[6];
char transmit_buffer[6];
/* the transmit and receiver buffers have the
 * following message components stored:
 * 0   destination address
 * 1   source address
 * 2   function code
 * 3   data 1
 * 4   data 2
 * 5   longitudinal redundancy check
 */ main(){
    if(transmitter_done){
        transmitter_done = NO;
        transmitter_busy = NO;
        switch(tx_type){
```

```
            case STATUS_CHG:
                if(message_transmitted)
                        /* send message transmitted signal to
                         * upper level code.
                         */
                        ;

else if(!message_received)
                        /* send message undelivered signal
                         * to upper level code.
                         */
                        ;
                else{ /* process received message first */
                        transmitter_done = YES;
                        transmitter_busy = YES;
                }
                break;
            default:
                break;
        }
    }
    if(message_received){
        message_received = NO;
        if(receiver_buffer[2] == 0    receiver_buffer[2] == 1){
            /* a data message relating to the use of the
             * telephone facilities, line 1, line 2, or
             * intercom, has been received.  This could be
             * a reservation for use, or a release of a
             * facility previously being used by requesting
             * a hang-up or to put the line on hold.
             * Each station must keep track of all usage status
             * so that status indicators will be controlled
             * correctly and so access to facilities already
             * in use will be denied.
             */
            ;
        }
        else if(receiver_buffer[2] == 2){
            switch(receiver_buffer[3]){
            case 2:         /* line 1 dial acknowledge */
                    /* if this station is using line 1,
                     * send a dialing complete signal to
                     * the upper level code.
                     */
                    break;
            case 3:         /* line 2 dial acknowledge */
                    /* if this station is using line 2,
                     * send a dialing complete signal to
                         * the upper level code.
                     */
                    break;
            case 4:
                switch(receiver_buffer[4]){
                case 2:  /* ring line 1 */
                        /* send line 1 ring signal to
                         * upper level code.
                         */
                        break;
                case 3:  /* ring line 2 */
                        /* send line 2 ring signal to
                         * upper level code.
                         */
                        break;
                    case 4:  /* off hook line 1 acknowledge */
                            /* if this station is trying to
                             * reserve line 1, send a
```

```
                                * confirmation signal to the
                                * upper level code.
                                */
                               break;
                case 5:        /* off hook line 2 acknowledge */
                               /* if this station is trying to
                                * reserve line 2, send a
                                * confirmation signal to the
                                * upper level code.
                                */
                               break;
                }
                break;
            case 9:       /* page received */
                /* send intercom page signal to upper
                 * level code.
                 */
                break;
            }
        }
    }

/* Other code that is called in the main loop would be
 * key pad scanning and switchhook transition detection that
 * would cause this station to go off hook on a line or dial.
 * Examples of this would be if this station tried to go off
 * hook on a currently idle line 1. The action would be
 * buffered until the transmitter is idle, at which time a
 * line 1 in use reservation message would be sent.
 *
 * message_to_tx(STATUS_CHG, '1', '0', '9');
 *
 * If the successful transmission of the above message is
 * confirmed, then the station will wait for an
 * acknowledgement message from the master station
 * before proceeding. However, if a data channel message
 * is received while the status change message was in the
 * transmitter, then the message will be * returned to the
 * upper level code untransmitted. If the newly received
 * message does nothing to make line 1 unavailable, the off
 * hook attempt will be repeated. If this station was off
 * hook on line 1 or 2 and dialing keys were pressed on the
 * keypad, the following code would be invoked when the
 * transmitter was idle:
 *
 * message_to_tx(UPDATE, '2', line, digit_to_dial);
 *
 * The station would then buffer up any subsequent dial key
 * presses until a dial acknowledgement was received from the
 * master station.
 */
} message_to_transmit(mess_type, func_code, data_1, data_2)
int mess_type;     /* message type to transmit */
int func_code;     /* message content */
int data_1;
int data_2;
/* called whenever there is a message to transmit,
 * and the transmitter is not busy.
 */
{
/* same as the subroutine of the same name in the master */
} transmitter(){
/* same as the subroutine of the same name in the master */
}
```

```
receiver(){
/* same as the subroutine of the same name in the master */
}
```

What is claimed is:

1. Telephone apparatus for installation at a subscriber's location and interconnection with a wire-pair that extends from the subscriber's location to a telephone switching system, the telephone apparatus including a master station and one or more remote stations bridged onto the wire-pair in a parallel electrical connection, each station including a hybrid circuit for interconnecting electrical signals, at baseband, between the wire-pair and a microphone and loudspeaker, characterized in that the master station comprises:

a processer for controlling the operation of the master station in accordance with a stored program, said processor exchanging signaling information with the telephone switching system over the wire-pair at baseband, and exchanging status and command information with the remote stations over the wire-pair at frequencies above baseband;

a data multiplexer for frequency shifting status information, generated by the processor into the frequency band above baseband;

means interconnecting the data multiplexer with the wire-pair;

a data demultiplexer for frequency shifting multiplexed command information, generated by the remote station, to baseband;

means interconnecting the data demultiplexer with the processor; and the remote station comprises:

a station housing including visual display devices and one or more manually operated switches for generating command information;

a data multiplexer for frequency shifting command information generated by the manually operated switches into the frequency band above baseband;

means interconnecting the data multiplexer with the wire-pair;

a data demultiplexer for frequency shifting multiplexed status information, generated by the processor at the master station, to baseband; and means interconnecting the baseband status information to the visual display device.

2. The telephone apparatus of claim 1 wherein the master station has an AC input impedance whose magnitude approximately matches the impedance of the wire-pair, and wherein the remote station has an AC input impedance whose magnitude is substantially higher than that of the master station, whereby the remote station does not significantly load AC signals on the wire-pair.

3. Telephone station apparatus for installation at a subscriber's location and interconnection with a wire-pair that extends from the subscriber's location to a telephone switching location, the station apparatus including a master station and one or more remote stations bridged onto the wire-pair in a parallel electrical connection, each station including a hybrid circuit for interconnecting electrical signals, in the audio frequency band, between the wire-pair and a microphone and loudspeaker, characterized in that the master station comprises:

means interconnected with the wire-pair for detecting the presence of ringing signals thereon and for generating a digital signal indicating the presence or absence of ringing signals;

a data multiplexer having input and output ports, responsive to said digital signal at its input port for frequency multiplexing same into a frequency band above the audio frequency band at its output port;

means interconnecting the output port of the data multiplexer with the wire-pair;

a data demultiplexer, interconnected to the wire-pair, responsive to a frequency multiplexed offhook command signal for converting same into an answer control signal at an output port thereof;

switching means, responsive to said answer control signal for enabling a dc electrical path between wires of said wire-pair; and the remote station comprises:

a manually operated switch for generating an offhook command signal;

a data multiplexer, responsive to the offhook command signal for frequency multiplexing same into the frequency band above the audio frequency band;

means connecting the frequency multiplexed offhook command signal to the wire-pair;

a data demultiplexer, responsive to the multiplexed digital signal, indicating the presence or absence of ringing, for converting same into an alerting control signal at its output port;

means responsive to said alerting control signal for generating an audible alerting signal.

4. The telephone station apparatus of claim 3 wherein the master station has an AC input impedance whose magnitude approximately matches the impedance of the wire-pair, and wherein the remote station has an AC input impedance whose magnitude is substantially higher than that of the master station, whereby the remote station does not significantly load AC signals on the wire-pair.

5. Telephone station equipment for installation at a subscriber's location and interconnection with a wire-pair that extends from the subscriber's location to a telephone switching location, that station equipment including a master station and one or more remote stations bridged onto the wire-pair in a parallel electrical connection, each station including a hybrid circuit for interconnecting electrical signals, in the audio frequency band, between the wire-pair and a microphone and loudspeaker, characterized in that the master station comprises:

a data demultiplexer, having input and output ports, responsive to a multiplexed digit selection command at its input port for converting same into a dialing signal at its output port;

means interconnecting the input port of the data demultiplexer with the wire-pair;

dialing means, responsive to the dialing signal, for generating electrical signals on the wire-pair indicating a telephone number to be dialed; and the remote station comprises:
- a keypad for manually selecting one or more digits to be dialed in establishing a telephone connection;
- means responsive to said keypad for generating a digit selection command; and
- a data multiplexer having input and output ports, responsive to the digit selection command at its input port for frequency multiplexing same into the frequency band above the audio frequency band at its output port.

6. The telephone station equipment of claim 5 wherein the dialing means comprises a dual tone multifrequency generator for generating touch-tone signals.

7. The telephone station equipment of claim 5 wherein the master station has an AC input impedance whose magnitude approximately matches the impedance of the wire-pair, and wherein the remote station has an AC input impedance whose magnitude is significantly higher than that of the master station, whereby the remote station does not substantially load AC signals on the wire-pair.

8. The telephone station equipment of claim 5 wherein the remote station has an off-hook DC input impedance whose magnitude is significantly higher than that of the master station, and wherein the dialing means comprises a switch for generating dial-pulse signals.

9. Improved apparatus for installation at a subscriber's location and interconnection with a wire-pair that extends from the subscriber's location to a telephone switching location, the apparatus including a master station and at least one remote station bridged onto the wire-pair in a parallel electrical connection, each station including a interface circuit for interconnecting electrical signals, in the audio frequency band, between the wire-pair and a microphone and loudspeaker, characterized in that the master station comprises:
- means interconnected with the wire-pair for detecting the presence of ringing signals thereon and for generating a digital signal indicating the presence or absence of ringing signals;
- a data multiplexer having input and output ports, responsive to said digital signal at its input port for frequency multiplexing same into a frequency band above the audio frequency band at its output port;
- means interconnecting the output port of the data multiplexer with the wire-pair; and the remote station comprises:
- a data demultiplexer, responsive to the multiplexed digital signal, indicating the presence or absence of ringing, for converting same into an alerting control signal at its output port; and
- means responsive to said alerting control signal for generating an audible alerting signal.

* * * * *